3,028,404
MANUFACTURE OF CYCLOPENTADIENYL METAL CARBONYL COMPOUNDS

Tillmon H. Pearson and John K. Presswood, Baton Rouge, La., assignors to Ethyl Corporation, New York, N.Y., a corporation of Delaware
No Drawing. Filed Nov. 3, 1958, Ser. No. 771,233
2 Claims. (Cl. 260—429)

This invention relates to the manufacture of cyclopentadienyl metal carbonyl compounds and more particularly to the manufacture of such compounds of metals of groups V–B, VII–B and the odd atomic numbered metals of group VIII of the periodic table.

Cyclopentadienyl metal carbonyl compounds, such as cyclopentadienyl manganese tricarbonyl, have been found to be exceptionally effective antiknocks for use in fuel for spark plug ignition internal combustion engines. These compounds not only have exceptional effectiveness as antiknocks but also many of these compounds have auxiliary properties which make them practical and desirable for commercial use. These auxiliary properties include high solubility in fuels, such as gasoline, and thermostability either alone or in gasolines which make these compounds entirely satisfactory for use under the widely varying conditions to which gasoline and other fuels are normally subjected. Possibly of even greater importance these compounds do not tend to form any appreciable deposits on the engine pistons, valves and spark plug surfaces and likewise are not abrasive to the engine parts as are characteristic of iron compounds.

It is accordingly an object of this invention to provide an improved process for the manufacturre of cyclopentadienyl metal carbonyl compounds of groups V–B, VII–B and the odd atomic numbered metals of group VIII of the periodic table. Another object is to provide a process of the above type using inexpensive raw materials and utilizing a minimum of process steps. Still another object is to provide a process which gives improved yields of the desired product. Another object of this invention is to provide a process which has exceedingly fast reaction rates. Other objects and advantages of the invention will be more apparent from the following description and appended claims.

It has now been found that cyclopentadienyl metal carbonyl compounds can be produced in excellent yields by reacting a metal compound of metals of groups V–B, VII–B and the odd atomic numbered metals of group VIII simultaneously with a dimeric cyclopentadienyl metal carbonyl of metals of group VI–B and the even atomic numbered metals of group VIII with gaseous carbon monoxide, and an elemental metal of groups I–A, II and III–A of the periodic table (see the periodic table in Handbook of Chemistry and Physics, 36th edition, pages 392 and 393).

More specifically, the process of this invention comprises reacting a dimeric cyclopentadienyl metal carbonyl, particularly hydrocarbon cyclopentadienyl compounds, of the formula $$[RM(CO)_x]_2$$

wherein R is a cyclopentadienyl group, M is a metal of group VI–B and the even atomic numbered metals of group VIII and $x$ is an integer of 1–3 inclusive, and a metal compound of metals of the formula $$M'X$$

wherein M' is a metal of groups V–B, VII–B and the odd atomic numbered metals of group VIII and X is an inorganic or organic anion, a metal of groups I–A, II and III–A with carbon monoxide, preferably in a liquid media which is a solvent for the M'X compound using carbon monoxide pressures of from about 0–8,000 p.s.i.g. In the most frequent and preferred forms of the invention the metal compound is represented as $M'X'_n$, wherein $X'$ is a halogen or a monovalent organic acid anion and $n$ is the valence of M'. Usually stoichiometric proportions are employed, i.e., one mole of the metal compound (M'X) to 0.5 mole of the dimeric compound. However, quantities of the metal compound corresponding to from about 0.1 to 100 moles per mole of the dimeric cyclopentadienyl metal compound can be used.

The process is preferably conducted at a temperature of from about 0 to 250° C., although the process can be conducted over a temperature range of about −25° to 300° C. or such temperatures wherein the reactants and products are stable. Higher pressures can be employed to increase the reaction rate, although, very surprisingly, the very high pressures, i.e., above about 10,000 p.s.i.g., appear to lower the product yield.

The compounds which can be made by the process of this invention are any cyclopentadienyl metal carbonyl of metals of groups V–B, VII–B and the odd atomic numbered metals of group VIII, including substituted cyclopentadienyl compounds, such as the indenyl and fluorenyl derivatives. Typical examples of such compounds are cyclopentadienyl vanadium tetracarbonyl,
methylcyclopentadienyl vanadium tetracarbonyl,
indenyl vanadium tetracarbonyl,
cyclopentadienyl niobium tetracarbonyl,
fluorenyl niobium tetracarbonyl,
cyclopentadienyl tantalum tetracarbonyl,
cyclopentadienyl manganese tricarbonyl,
methylcyclopentadienyl manganese tricarbonyl,
n-butylcyclopentadienyl manganese tricarbonyl,
isobutylcyclopentadienyl manganese tricarbonyl,
n-decylcyclopentadienyl manganese tricarbonyl,
phenylcyclopentadienyl manganese tricarbonyl,
methylphenylcyclopentadienyl manganese tricarbonyl,
indenyl manganese tricarbonyl,
fluorenyl manganese tricarbonyl,
cyclopentadienyl technetium tricarbonyl,
cyclopentadienyl rhenium tricarbonyl,
cyclopentadienyl cobalt dicarbonyl,
methylcyclopentadienyl cobalt dicarbonyl,
ethylcyclopentadienyl cobalt dicarbonyl,
phenylcyclopentadienyl cobalt dicarbonyl,
cyclopentadienyl rhodium dicarbonyl,
indenyl rhodium dicarbonyl, and
cyclopentadienyl iridium dicarbonyl.

For fuel use, the preferred compounds are those containing up to about 12 carbon atoms in the cyclopentadienyl group.

The liquid media, when employed, suitable for the process of this invention can be any solvent or complexing agent for the metal compound. In general, suitable solvents are ethers, amines, amides, nitriles, and the like. The ethers can be either aliphatic or aromatic, such as dimethyl ether, diethyl ether, methylethyl ether, anisole, diphenyl ether and, in general, any ether which is liquid at the reaction temperature and pressure employed. Preferred ethers are the cyclic ethers and the ethylene glycol type ethers. Typical examples are dioxane, tetrahydrofuran, ethylene glycol dimethyl ether, and corresponding higher alkyl ethers, such as diethyl, methyl ethyl, dibutyl, and the like. Typical examples of diethylene glycol dialkyl ethers are the dimethyl, diethyl, methyl ethyl, dibutyl and the triethylene glycol ethers including the dimethyl, diethyl, diisopropyl, and the like. In general the preferred ethylene glycol dialkyl ethers have alkyl groups containing from 1 to 6 carbon atoms.

Suitable amine solvents for use in this invention are propyl amine, diethyl amine, di-n-propyl amine, dibutyl amine, triethyl amine, triisopropyl amine, and other amines having from 2 to 10 carbon atoms per alkyl group. Aromatic amines are also suitable, such as aniline, methyl aniline, dimethyl aniline, trimethyl aniline, and similar compounds. A particularly suitable amine solvent is dicyclohexylamine. In general, amines containing aryl groups up to 10–20 carbon atoms are preferred.

Typical examples of suitable amides are formamide, and the mono- and dialkyl formamides, such as N,N-dimethyl formamide, containing alkyl groups having from 1 to 6 carbon atoms. Other suitable amides are cyclic amides, such as N-methyl pyrrolidone and other alkyl pyrrolidones, and amides of inorganic acids, such as hexamethyl phosphoramide.

Suitable nitriles which can be employed as solvents in this invention are acetonitrile, propionitrile, butyronitrile and the like.

The liquid media when employed can be employed in a wide range of concentration from about 0.5 mole, based upon the metal compound, to about 30 moles. Higher dilution of the reaction mixture can be employed except that no appreciable improvement in the reaction is obtained and considerably greater difficulty is encountered in the recovery of the desired product.

Any of the metal compounds can be employed in this invention such as oxide, sulfide, and halide, including chloride, bromide, iodide, fluoride, sulfate, carbonate, and nitrate. Of these, the halides are preferred and especially the chloride. The organic compounds of metal are also useful in this invention including metal formate, acetate, propionate, butyrate, oxalate, tartrate, acetyl acetonate, naphthenate and other salts of organic acids having up to about 20 carbon atoms.

The metals of groups I-A, II and III-A suitable for this invention are lithium, sodium, potassium, rubidium, cesium, beryllium, magnesium, calcium, strontium, barium, zinc, cadmium, mercury, boron, aluminum, gallium, indium, and thallium. Of these the preferred metals are lithium, sodium, potassium, magnesium and aluminum.

These metals are employed in a concentration of from about molar equivalence to about 300 percent excess, based upon the metal compound. Even greater excesses can be employed without effecting the reaction but, in general, this is uneconomical and creates problems in recovery of the product. Lesser quantities, i.e., 0.5 mole per mole of metal compound, can be used but poorer results are obtained.

The metals of groups I-A, II and III-A are preferably employed in the process in an active form. Best results are obtained when the metal is finely divided, that is having a particle size ranging from about 5 microns up to particles having 2 to 4 millimeters in thickness. The metal preferably should have a clean surface, essentially uncontaminated with an oxide coating. It is found that powdered metals available commercially are very suitable. With the group I-A metals, dispersions in an inert media can be used.

The following examples illustrate the process of this invention. All parts are given as parts by weight.

Example I

To a reaction vessel equipped with means for agitating the reaction mixture was added one part of manganese chloride, 0.8 part of magnesium metal powder, 1.4 parts of dimeric methylcyclopentadienyl iron dicarbonyl

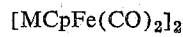
[MCpFe(CO)$_2$]$_2$ and 50 parts of N,N-dimethyl formamide. The reactor was then sealed and pressurized to 300 p.s.i.g. with gaseous carbon monoxide and the reaction mass heated with agitation to a temperature of 100° C. for 1.5 hours. The reactor was then cooled and the reaction product steam distilled to recover the desired methylcyclopentadienyl manganese tricarbonyl. The product was recovered by steam distillation in about 75 percent yield, based upon both the manganous chloride and the dimeric iron compound charged to the reactor. The purified methylcyclopentadienyl manganese tricarbonyl has exceptional antiknock effect when used in fuels, employed, for example, in accordance with the procedures gives in U.S. Patent 2,818,417.

When the above example was repeated using 25, 4000 and 8000 p.s.i.g., similar results were obtained but the yield of product was somewhat decreased in each case. Also, similar results are obtained when using beryllium and calcium instead of magnesium.

Example II

Manganese chloride (one part) was charged to a reactor with 0.8 part of magnesium metal powder and 1.4 parts of dimeric methylcyclopentadienyl iron dicarbonyl. N,N-dimethylformamide (50 parts) was employed as the solvent. The reaction was conducted at 200° C. using 1000 p.s.i.g. carbon monoxide pressure. A good yield of methylcyclopentadienyl manganese tricarbonyl was obtained. Similar results are obtained with technetium and rhenium chlorides.

Example III

Example I was repeated except that the temperature was maintained at 75° C. and 100 p.s.i.g. carbon monoxide pressure was employed. Generally similar results were obtained.

Example IV

Cobalt chloride (1.1 parts) was reacted with 1.4 parts of dimeric methylcyclopentadienyl iron dicarbonyl and one part of powdered magnesium in dimethyl formamide solvent (50 parts). The reaction mixture was heated to 100° C. using 300 p.s.i.g. carbon monoxide pressure. A good yield of methylcyclopentadienyl cobalt dicarbonyl was obtained. Similar results are obtained with cyclopentadienyl ruthenium dicarbonyl dimer and cyclopentadienyl osmium dicarbonyl dimer.

Example V

One mole of manganese acetate is reacted with two mole equivalents of aluminum metal and dimeric cyclopentadienyl molybdenum tricarbonyl. The reaction is carried out in 100 parts of hexamethyl phosphoramide per part of reactants. The reaction temperature is maintained at 200° C., using 4000 p.s.i.g. carbon monoxide pressure. An excellent yield of cyclopentadienyl manganese tricarbonyl is obtained. Similar results are obtained with boron and gallium, in place of the aluminum.

Example VI

Example I is repeated except that manganese naphthenate is reacted with dimeric indenyl nickel carbonyl in tetrahydofuran solvent in the presence of two mole equivalents of metallic sodium. The reaction mixture is maintained at 20° C. using 25 p.s.i.g. carbon monoxide pressure. A good yield of the indenyl manganese tricarbonyl is recovered from the reaction product.

Example VII

Vanadium sulfate is reacted with dimeric cyclopentadienyl iron dicarbonyl in the presence of three mole equivalents of zinc dust in dicyclohexylamine solvent. The reaction mixture is stirred and heated at 120° C. for five hours while maintaining a pressure of carbon monoxide of 8000 p.s.i.g. The cyclopentadienyl vanadium tetracarbonyl is recovered in excellent yield. Similar results are obtained with vanadium oxide and nitrate, instead of the sulfate.

Example VIII

Vanadium bromide is reacted with dimeric fluorenyl chromium tricarbonyl and zinc dust (200 percent stoichiometric excess) at a temperature of 130° C. and a carbon monoxide pressure of 1500 p.s.i.g. in acetonitrile solvent. The reaction mixture is stirred vigorously for three and one-half hours and the fluorenyl vanadium tetracarbonyl is recovered in excellent yield by steam distillation.

*Example IX*

Example I is repeated except that cobalt iodide is reacted with dimeric ethylcyclopentadienyl nickel carbonyl in the presence of a molecular excess of sodium. The temperature of the reaction is maintained at 75° C., using 100 p.s.i.g. of carbon monoxide pressure. The ethylcyclopentadienyl cobalt dicarbonyl is recovered by steam distillation.

*Example X*

Manganous bromide (one part) is reacted with two parts of ethylcyclopentadienyl chromium tricarbonyl dimer in the presence of powdered aluminum (five parts) in anisole solvent at a temperature of 120° C. and a carbon monoxide pressure of 1000 p.s.i.g. The reaction mixture is stirred for five hours giving a good yield of ethylcyclopentadienyl manganese tricarbonyl. This product is recovered by steam distillation in the reaction mixture.

*Example XI*

To a reaction vessel equipped with means for agitating the reaction mixture is added one part of manganese chloride, 0.8 part of magnesium metal powder and 1.4 parts of dimeric methylcyclopentadienyl iron dicarbonyl $[MCpFe(CO)_2]_2$. The reactor is then sealed and pressurized to 300 p.s.i.g. with gaseous carbon monoxide and the reaction mass heated with agitation to a temperature of 125° C. for 1.5 hours. The reactor was then cooled and the reaction product steam distilled to recover the desired methylcyclopentadienyl manganese tricarbonyl. A good yield of methylcyclopentadienyl manganese tricarbonyl is obtained.

The dimeric cyclopentadienyl metal carbonyl compounds employed in this process can be made by reaction of the corresponding metal carbonyl with the cyclopentadiene hydrocarbon. For example, iron pentacarbonyl can be reacted with cyclopentadiene (in monomeric or dimeric form) at elevated temperatures to form dicyclopentadienyl diiron tetracarbonyl (U.S. 2,810,736). These compounds have a bridged structure in which the carbon atoms of two carbonyl groups are bonded to and bridge the two metal atoms. The other metal compounds, e.g., nickel, chromium and molybdenum can be prepared in like manner.

We claim:
1. A process for the manufacture of cyclopentadienyl hydrocarbon metal carbonyl compounds of metals of groups V–B, VII–B and the odd atomic numbered metals of group VIII comprising reacting a metal salt of a metal of groups V–B, VII–B and the odd atomic numbered metals of group VIII, dimeric cyclopentadienyl hydrocarbon metal carbonyl of metals of group VI–B and the even atomic numbered metals of group VIII, carbon monoxide and a metal selected from the group consisting of groups I–A, II and III–A of the periodic table, said reaction being conducted at a temperature of from —25 to 300° C. and at a pressure of from about one atmosphere to about 10,000 p.s.i.g., the concentration of said metal salt being from 0.1 to about 100 moles per mole of said dimeric cyclopentadienyl hydrocarbon metal carbonyl.

2. A process for the manufacture of cyclopentadienyl hydrocarbon metal carbonyl compounds of metals of groups V–B, VII–B and the odd atomic numbered metals of group VIII comprising reacting dimeric cyclopentadienyl hydrocarbon metal carbonyl of the formula $$[RM(CO)_x]_2$$

wherein R is a cyclopentadienyl hydrocarbon group, M is a metal of group VI–B and the even atomic numbered metals of group VIII and $x$ is an integer of 1–3 inclusive; a metal salt of a metal of the formula $$M'X'_n$$

wherein M' is a metal of groups V–B, VII–B and the odd atomic numbered metals of group VIII and X' is selected from the group consisting of halides and monovalent organic acid anions and $n$ is the valence of M'; a metal of groups I–A, II and III–A of the Periodic Table; and carbon monoxide, said carbon monoxide being employed at a pressure of from 0 to 8,000 p.s.i.g., said metal salt being employed in the concentration of about 1 mole per 0.5 mole of said dimeric cyclopentadienyl hydrocarbon metal carbonyl, said reaction being conducted at a temperature of from 0–250° C.

References Cited in the file of this patent
UNITED STATES PATENTS

| | | |
|---|---|---|
| 2,810,736 | Catlin et al. | Oct. 22, 1957 |
| 2,818,417 | Brown et al. | Dec. 31, 1957 |
| 2,870,180 | Kozikowski et al. | Jan. 20, 1959 |
| 2,916,506 | Axtell et al. | Dec. 8, 1959 |

OTHER REFERENCES

Fischer et al.: Zeit. Naturforsch. 9b, p. 618 (1954).
Trifan et al.: "Journal of the American Chemical Society," volume 79, No. 11, June 5, 1957, pages 2746–2749.